United States Patent
Wu et al.

(10) Patent No.: US 11,412,518 B2
(45) Date of Patent: Aug. 9, 2022

(54) COMMUNICATION METHOD, NETWORK DEVICE AND TERMINAL DEVICE

(71) Applicants: Alcatel Lucent, Nozay (FR); Nokia Solutions and Networks Oy, Espoo (FI)

(72) Inventors: Zhuo Wu, Shanghai (CN); Jun Wang, Shanghai (CN); Gang Shen, Shanghai (CN); Karol Schober, Helsinki (FI)

(73) Assignees: Nokia Solutions and Networks OY, Espoo (FI); Alcatel Lucent, Nozay (FR)

( * ) Notice: Subject to any disclaimer, the term of this patent is extended or adjusted under 35 U.S.C. 154(b) by 8 days.

(21) Appl. No.: 16/323,306

(22) PCT Filed: Jul. 27, 2017

(86) PCT No.: PCT/IB2017/001211
§ 371 (c)(1),
(2) Date: Feb. 5, 2019

(87) PCT Pub. No.: WO2018/029541
PCT Pub. Date: Feb. 15, 2018

(65) Prior Publication Data
US 2021/0282142 A1 Sep. 9, 2021

(30) Foreign Application Priority Data
Aug. 9, 2016 (CN) .......................... 201610647599.7

(51) Int. Cl.
*H04W 52/24* (2009.01)
*H04W 72/04* (2009.01)
*H04W 52/14* (2009.01)

(52) U.S. Cl.
CPC ..... *H04W 72/0473* (2013.01); *H04W 52/143* (2013.01); *H04W 52/243* (2013.01)

(58) Field of Classification Search
CPC .... H04B 7/0456; H04B 7/0697; H04B 17/30; H04W 52/24; H04W 88/02; H04W 52/16; H04W 92/18; H04W 36/20
See application file for complete search history.

(56) References Cited

U.S. PATENT DOCUMENTS

2010/0246711 A1   9/2010 Kishigami et al.
2018/0110017 A1*  4/2018 Jha ....................... H04B 7/0456

FOREIGN PATENT DOCUMENTS

CN   104918311 A   9/2015
CN   105827376 A   8/2016
(Continued)

OTHER PUBLICATIONS

"3$^{rd}$ Generation Partnership Project; Technical Specification Group Radio Access Network; Study on Downlink Multiuser Superposition Transmission (MUST) for LTE (Release 13)," 3GPP TR 36.859 V13.0.0, pp. 1-48, XP051294865, (Dec. 2015).
(Continued)

*Primary Examiner* — Tu X Nguyen
(74) *Attorney, Agent, or Firm* — Fay Sharpe LLP

(57) ABSTRACT

Embodiments of the present disclosure relate to a communication method, a network device and a terminal device. There is provided a communication method implemented at a network device, comprising: determining power allocation information for multiuser superposition transmission, the power allocation information indicating power allocation for the multiuser superposition transmission between a near terminal device and far terminal devices on one or more spatial layers; and transmitting the power allocation information to the near terminal device dynamically. There is also provided a communication method implemented at a terminal device, as well as corresponding network device and terminal device.

6 Claims, 6 Drawing Sheets

(56) References Cited

FOREIGN PATENT DOCUMENTS

| EP | 3 386 243 A1 | 10/2018 |
|----|--------------|---------|
| WO | WO 2015/187298 A1 | 12/2015 |
| WO | WO 2016/065921 A1 | 5/2016 |

OTHER PUBLICATIONS

"Consideration of Efficient Control Signaling for MUST," $3^{rd}$ Generation Partnership Project (3GPP), 3GPP TSG RAN WG1 #84bis, R1-162562, 5 pages, XP051079621, Busan, Korea, Apr. 11-15, 2016.

ASUSTeK, "Discussion on Downlink Control Signaling for MUST," $3^{rd}$ Generation Partnership Project (3GPP), 3GPP TSG-RAN WG1 Meeting #83, R1-157239, 3 pages, XP051003460, Anaheim USA, Nov. 16-20, 2015.

MediaTek Inc., "New SI Proposal: Study on Downlink Multiuser Superposition Transmission for LTE," $3^{rd}$ Generation Partnership Project (3GPP), 3GPP TSG RAN Meeting #67, RP-150496, 6 pages, Shanghai, China, Mar. 9-15, 2015.

MediaTek Inc., "Blind Detection Evaluation on Interference Existence for Case 1," $3^{rd}$ Generation Partnership Project (3GPP), 3GPP TSG-RAN WG1 Meeting #85, R1-164979, 13 pages, Nanjing, China, May 23-27, 2016.

"$3^{rd}$ Generation Partnership Project; Technical Specification Group Radio Access Network; Evolved Universal Terrestrial Radio Access (E-UTRA); Physical layer procedures (Release 14)," 3GPP TS 36.213 V14.0.0, pp. 1-406, (Sep. 2016).

International Search Report for PCT/IB2017/001211 dated Nov. 7, 2017.

ZTE, "Performance evaluation of MUST for selection of potential power ratios," 3GPP TSG RAN WG1, Meeting #85, R1-164282, Nanjing, China, May 23-27, 2016, pp. 1-8.

Rong Wang, "A Joint Method of Resource Allocation and Power Control for Device-to-Device (D2D) Communication," (English language Abstract.Telecommunication Engineering, vol. 56, No. 3, Mar. 2016, pp. 295-301.

"Near-far effect study in D2D communication," English language Abstract on pp. iv and v, 71 pages.

* cited by examiner

COMMUNICATION METHOD, NETWORK DEVICE AND TERMINAL DEVICE

FIELD

Embodiments of the present disclosure generally relate to communication technologies, and more particularly, to a communication method implemented at a network device and a terminal device, and the corresponding network device and terminal device.

BACKGROUND

In recent years, multiuser superposition transmission (MUST) technology has been proposed and discussed. The MUST technology usually refers to transmitting multiple data streams of multiple users at the same time, frequency and/or spatial resource and restoring data of different users at the receiving end by interference cancellation or iterative decoding. In implementation, the MUST technology involves superposition of a code domain, a power domain, a constellation domain (or a bit domain), and so on. As to the application scenario, the MUST technology involves a downlink transmission and an uplink transmission.

Where a communication network has a higher traffic load, multiple user equipment (UE) may be paired to bring about more capacity gains to the communication network by using the MUST technology. Typically, a near UE and a far UE may be paired dynamically, e.g., may be paired on different spatial layers or in different subbands, to increase the possibility of MUST pairing. In addition, MUST transmission and non-MUST transmission may coexist in some communication networks, and may be switched in a dynamic way.

However, in cases of dynamic pairing or dynamic switching of the MUST and non-MUST transmissions, conventional power allocation approaches cannot adapt to the changing of MUST pairing and/or dynamic switching of the MUST and non-MUST transmissions. For example, in cases of dynamic MUST pairing, especially switching of a UE between the MUST and the non-MUST subframe by subframe, it is difficult for the UE to detect signals of a further UE that is paired with the UE, let alone cancel interference caused by the signals of the further UE. Thereby, the system performance will be severely degraded.

Besides, in case of rank 2 MUST-near UE with two spatial layers, if MUST is performed on one (also referred to as "first layer") of the two layers, while a single user transmission is performed on the other layer (also referred to as "second layer"), and if the transmit power is equally split between the two spatial layers, then communication on the second layer may cause severe interference to communication on the first layer. Therefore, performance of signal detection at the MUST-near UE on the first layer will be degraded.

SUMMARY

Generally the embodiments of the present disclosure propose a communication method implemented at a network device and a terminal device, as well as the corresponding network device and terminal device.

In a first aspect, the embodiments of the present disclosure provide a communication method implemented at a network device. The method comprises: determining power allocation information for multiuser superposition transmission, the power allocation information indicating power allocation for the multiuser superposition transmission between a near terminal device and far terminal devices on one or more spatial layers; and transmitting the power allocation information to the near terminal device dynamically.

In this aspect, the embodiments of the present disclosure further provide a network device, comprising: a controller configured to determine power allocation information for multiuser superposition transmission, the power allocation information indicating power allocation for the multiuser superposition transmission between a near terminal device and far terminal devices on one or more spatial layers; and a transceiver configured to transmit the power allocation information to the near terminal device dynamically.

The embodiments of the present disclosure further comprise a network device. The network device comprises: a processor and a memory having instructions stored therein, which, when run by the processor, cause the network device to execute a method according to this aspect.

The embodiments of the present disclosure further comprise an apparatus. The apparatus comprises: means for determining power allocation information for multiuser superposition transmission, the power allocation information indicating power allocation for the multiuser superposition transmission between a near terminal device and far terminal devices on one or more spatial layers; and means for transmitting the power allocation information to the near terminal device dynamically.

In a second aspect, the embodiments of the present disclosure provide a communication method implemented at a terminal device. The terminal device is a near terminal device of a network device. The method comprises: receiving from the network device power allocation information for multiuser superposition transmission, the power allocation information indicating power allocation for the multiuser superposition transmission between the near terminal device and far terminal devices on one or more spatial layers; and determining a transmit power for a reference signal of the near terminal device based on the power allocation information.

In this aspect, the embodiments of the present disclosure further provide a terminal device. The terminal device comprises: a transceiver configured to receive from the network device power allocation information for multiuser superposition transmission, the power allocation information indicating power allocation for the multiuser superposition transmission between the near terminal device and far terminal devices on one or more spatial layers; and a controller configured to determine a transmit power for a reference signal of the near terminal device based on the power allocation information.

The embodiments of the present disclosure further comprise a terminal device. The terminal device comprises: a processor and a memory having instructions stored therein, which, when run by the processor, cause the terminal device to execute a method according to this aspect.

The embodiments of the present disclosure further comprise an apparatus. The apparatus comprises: means for receiving from a network device power allocation information for multiuser superposition transmission, the power allocation information indicating power allocation for the multiuser superposition transmission between a near terminal device and far terminal devices on one or more spatial layers; and means for determining a transmit power for a reference signal of the near terminal device based on the power allocation information.

As is to be understood from the following description, according to the embodiments of the present disclosure, power allocation of the MUST-near user equipment can be dynamically indicated, such that the probability of successful signal detection at the near user equipment is increased. In this way, under the premise of lower signaling overhead and system complexity, the probability of MUST pairing and the capacity provided by MUST can be improved significantly, and further the system performance can be improved effectively.

It should be appreciated contents as described in the SUMMARY portion are not intended to limit key or important features of the embodiments of the present disclosure or used to limit the scope of the present disclosure. Other features of the present disclosure will become easier to understand from the following description.

BRIEF DESCRIPTION OF THE DRAWINGS

The above and other features, advantages and aspects of various embodiments of the present disclosure will become apparent from the following detailed illustration, when taken in conjunction with the accompanying drawings in which the same or similar reference numerals denote the same or similar elements, wherein.

DETAILED DESCRIPTION OF EMBODIMENTS

Figure 1:
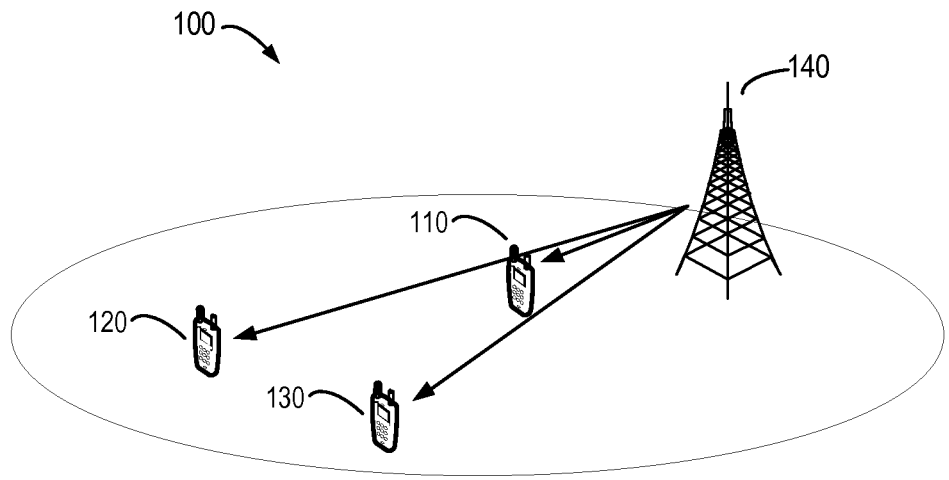
FIG. 1 shows an exemplary communication network in which the embodiments of the present disclosure are implemented.

Embodiments of the present disclosure will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure. It should be understood that the accompanying drawings and embodiments of the present disclosure are merely for the illustration purpose, rather than limiting the protection scope of the present disclosure.

The term "network device" used here refers to other entity or node with specific functionality in a base station or communication network. The "base station (BS)" may represent a node B (NodeB or NB), an Evolved Node B (eNodeB or eNB), a remote radio unit (RRU), a radio-frequency head (RH), a remote radio head (RRH), a repeater, or a low power node such as a Picocell, a Femto cell and the like. In the context of the present disclosure, the terms "network device" and "base station" may be used interchangeably, and generally, the eNB is taken as an example of the network device, for the sake of discussion.

The term "terminal device" or "user equipment (UE)" used here refers to any terminal device that can perform wireless communication with the network device or one another. As an example, the terminal device may comprise a mobile terminal (MT), a subscriber station (SS), a portable subscriber station (PSS), a mobile station (MS) or an access terminal (AT), and the above on-board devices. In the context of the present disclosure, the terms "terminal device" and "user equipment" may be used interchangeably for the sake of discussion.

The term "downlink multiuser superposition transmission" (or "DL MUST") used here refers to that DL signals from the base station to multiple terminal devices are superposed (or combined) in transmission. In this case, a signal received by the terminal device from the base station comprises not only its own signal (or referred to as "useful signal"), but also a signal (or referred to as "interfering signal") of other terminal device.

The term "spatial layer" user here refers to a spatial transmission channel layer. Mutually separated spatial layers may be formed by arranging specific weight vectors for a plurality of transmit antennas. The terms "comprise", "include" and their variants used here are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in description below.

As described above, conventional solutions have proposed to perform dynamic pairing of MUST UE subframe by subframe, and to pair UE with multiple other UE on different spatial layers. However, in cases of dynamic pairing, especially dynamic switching of UE between MUST configuration and non-MUST configuration subframe by subframe, there is need to cancel interference from other devices, so as to correctly detect signals at the side of a paired near UE.

Although conventional solutions have proposed to send some candidate parameters from a service eNB to UE so as to assist the UE in detecting signals of paired UE. Moreover, the UE can further obtain other parameters through blind detection. Nevertheless, these candidate parameters can only be sent at long time intervals via a high layer signaling. When MUST pairing (or switching) is dynamically updated in different subframes, these parameters cannot work well in signal detection at UE side. In addition, if the UE obtains all parameters through blind detection, then the decoding complexity will become too high and time-consuming for the UE. Meanwhile, such blind detection cannot adapt to dynamic MUST pairing or switching.

Therefore, there is a need for an effective approach such that the UE can duly obtain these parameters, such as power allocation information, so as to cancel interference on UE's signal detection in dynamic MUST pairing or switching to enable the UE to successfully detect useful signals. This is particularly beneficial to the near UE in MUST pairing, because traditionally the eNB allocates a higher power to the far UE than the near UE, and accordingly interference from the paired UE is stronger at the near UE. In the context of the present disclosure, near user equipment (also referred to as "near UE") and far user equipment (also referred to as "far UE") refer to a UE that is far away from a network device (e.g., eNB) and a UE that is near to the network device in MUST pairing, respectively. In particular, if the near UE that supports rank 2 and two spatial layers is paired with one far UE on only one spatial layer, or if the near UE is paired with one far UE on one spatial layer and paired with another far UE on another spatial layer, then such interference would be especially significant.

To overcome these and other potential problems, the embodiments of the present disclosure provide a communication method. With the method, a network device may send power allocation information to the near user equipment. The power allocation information indicates power allocation among the near terminal device and far terminal device(s) on one or more spatial layers for performing the multiuser superposition transmission. Accordingly, the near terminal device can detect reference signals based on the received power allocation information, thereby canceling signal interference from other device, increasing the success probability of signal detection, and improving the system performance.

FIG. 1 shows an exemplary communication network 100 in which the embodiments of the present disclosure may be implemented. The communication network 100 comprises a network device 140 and three terminal devices, namely a first terminal device 110, a second terminal device 120 and a third terminal device 130. The network device 140 can communicate with the three terminal devices 110 to 130. Accordingly, the three terminal devices 110 to 130 can communicate with each other via the network device 140. It should be understood the number of network device and the number of terminal devices as shown in FIG. 1 are merely for the illustration purpose, without suggesting any limitation. The network 100 may include any appropriate number of network devices and/or terminal devices.

As depicted, in this example, the first terminal device 110 is near to the network device 140, while the second terminal device 120 and the third terminal device 130 are far away from the network device 140. It should be understood this is merely illustrative rather than limiting. The three terminal devices 110 to 130 may be located in any position either near or far from the network device 140. In this example, the first terminal device 110 may be referred to as "near terminal device 110", and the second terminal device 120 and the third terminal device 130 may be referred to as "far terminal device 120" and "far terminal device 130", respectively.

According to the embodiments of the present disclosure, the network device 140 may pair the first terminal device 110 with the second terminal device 120 as a MUST pair. It should be understood that in addition to pairing the first terminal device 110 with the second terminal device 120, the network device 140 may further pair the first terminal device 110 with any number of other terminal devices in the network 100 into MUST pair(s) or MUST group(s).

Figure 2:
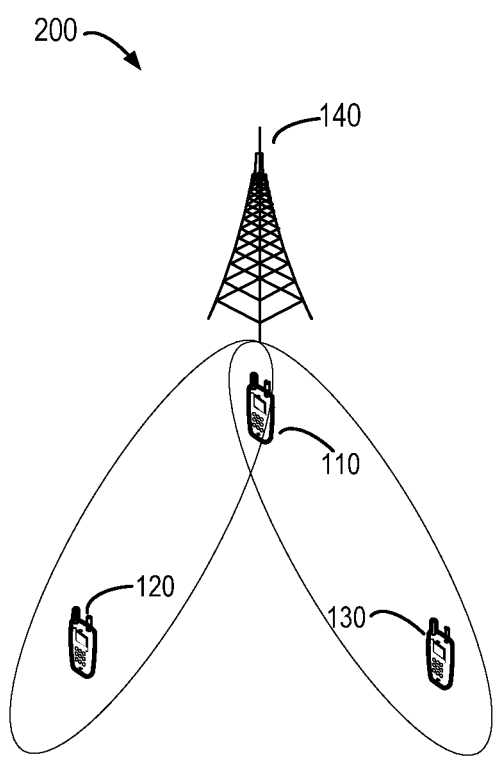
FIG. 2 shows a MUST configuration according to some embodiments of the present disclosure.

FIG. 2 shows a MUST configuration 200 according to some embodiments of the present disclosure. As shown in FIG. 2, the network device 140 may pair the first terminal device 110 with the second terminal device 120 on one (referred to as "first spatial layer") of two spatial layers, and pair the first terminal device 110 with the third terminal device 130 on the other spatial layer (referred to as "second spatial layer"). An embodiment in this regard will be described in detail below.

Communication in the network 100 may be implemented according to any appropriate communication protocol, including without limitation to, the first generation (1G), the second generation (2G), the third generation (3G), the fourth generation (4G), the fifth generation (5G) and other cellular communication protocol, wireless local area network communication protocols such as Institute of Electrical and Electronics Engineers (IEEE) 802.11, and/or any other protocols that are currently known or to be developed later. Furthermore, the communication utilizes any appropriate wireless communication technology, including without limitation to, code division multiple access (CDMA), frequency division multiple access (FDMA), time division multiple access (TDMA), frequency division duplexing (FDD), time division duplexing (TDD), multiple input multiple output (MIMO), orthogonal frequency division multiplexing (OFDM), and/or any other technology that is currently known or to be developed in future.

In the foregoing example, the first terminal device 110 is nearer to the network device 140 than the second terminal device 120. In other words, the first terminal device 110 is a near terminal device, while the second terminal device 120 is a far terminal device. In this case, as described above, for the purpose of reducing path loss, the network device 140 usually allocates a larger power to the far terminal device 120, leading to a larger interference to the near terminal device 110. According to the embodiments of the present disclosure, the near terminal device 110 may determine power allocation information for multiuser superposition transmission. The power allocation information indicates power allocation for the multiuser superposition transmission between a near terminal device and far terminal devices on one or more spatial layers and may be transmitted dynamically to the near terminal device. In this way, it is possible to increase the probability that the near terminal device 110 corrects performs signal detection, so that the system performance may be improved effectively.

It should be understood the number of network device and the number of terminal devices as shown in FIG. 1 and FIG. 2 are merely for the illustration purpose without suggesting any limitation. The communication network 100 may comprise any appropriate type and/or number of network device(s), each network device may provide an appropriate scope and/or number of coverage, and the communication network 100 may further comprise any appropriate type and/or number of terminal devices.

With reference to FIG. 3 to FIG. 8, principles and specific embodiments of the present disclosure will be illustrated in detail from the perspective of the network device 140 and the near terminal device 110. First referring to FIG. 3, this figure shows a flowchart of a method 300 for indicating power allocation according to some embodiments of the present disclosure. It will be understood the method 300 may be implemented at, for example, the network device 140 as shown in FIGS. 1 and 2. For the discussion purpose, description is presented below to the method 300 with reference to FIGS. 1 and 2.

At 310, power allocation information for multiuser superposition transmission is determined. The power allocation information indicates power allocation for the multiuser superposition transmission between a near terminal device and far terminal devices on one or more spatial layers.

According to the embodiments of the present disclosure, the power allocation information may be determined in a variety of ways.

In some embodiments, the network device 140 has one spatial layer, wherein the near terminal device 110 and the far terminal device 120 communicate with the network device 140 on this spatial layer. In this case, the network device 140 may determine pairing information between the near terminal device and a far terminal device on one spatial layer. The pairing information indicates whether the near terminal device is paired with the far terminal device on the spatial layer to perform the multiuser superposition transmission. Then, the network device 140 may determine power allocation information based on the pairing information. The power allocation information may include, for example, pairing information between the near terminal device and the far terminal device, power allocation indication between the near terminal device and the far terminal device on the spatial layer, and/or other relevant information.

As an alternative, in some embodiments, the network device 140 may have a plurality of spatial layers, for instance, 2 spatial layers as shown in FIG. 2. In the example shown in FIG. 2, the near terminal device 110 and the far terminal device 120 communicate with the network device 140 on the first spatial layer, and the near terminal device 110 and the far terminal device 130 communicate with the network device 140 on the second spatial layer. In this case, the network device 140 may determine pairing information between the near terminal device and far terminal devices on a plurality of spatial layers. In the embodiments of the present disclosure, the pairing information indicates whether the near terminal device is paired with the far terminal device on each of a plurality of spatial layers to perform the multiuser superposition transmission. Then, the network device 140 may determine power allocation information based on the pairing information. The power allocation information may include, for example, pairing information between the near terminal device and the far terminal device on each of the plurality of spatial layers, power allocation indication among the plurality of spatial layers, power allocation indication between the near terminal device and the far terminal device on each of the plurality of spatial layers, and/or other appropriate information.

At 320, the power allocation information is dynamically transmitted to the near terminal device. According to the embodiments of the present disclosure, the network device 140 may transmit the power allocation information to the near terminal device 110 in downlink control information (e.g., DCI or enhanced DCI) of a subframe. In some embodiments, the subframe for sending the power allocation information may be a specific subframe, e.g., one or more predefined subframes. The predefined subframe may be a certain subframe or a plurality of continuous or discontinuous subframes. In case of discontinuous subframes, these subframes may have regular or irregular intervals. In the above embodiments, the network device 140 only sends the power allocation information to the near terminal device 110 on these predefined subframes. As an alternative, in some other embodiments, the network device 140 may send the power allocation information to the near terminal device 110 in downlink control information of each subframe.

It should be understood the foregoing example is merely illustrative rather than suggesting any limitation. In other embodiments, the network device 140 may send the power allocation information at other appropriate information position(s) in the subframe.

Figure 4:
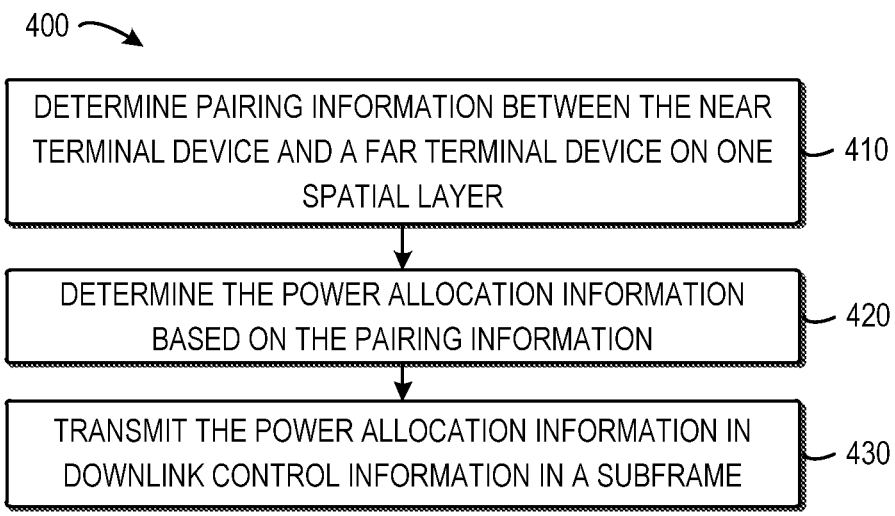
FIG. 4 shows a flowchart of a method for indicating power allocation implemented at the network device side according to some embodiments of the present disclosure.

FIG. 4 shows a flowchart of a method 400 for indicating power allocation implemented at the network device side according to some embodiments of the present disclosure. The method 400 may be regarded as one implementation of the method 300 and may be implemented at the network device 140 as shown in FIG. 1 and FIG. 2. In the embodiment shown in FIG. 4, the network device 140 has only one spatial layer (e.g., the first spatial layer in FIG. 2), on which the near terminal device 110 and the far terminal device 120 communicate with the network device 140. It should be understood the method 400 is merely exemplary rather than limiting, and the embodiments of the present disclosure should not be construed as being limited thereto.

At 410, pairing information between a near terminal device and a far terminal device on one spatial layer is determined. According to the embodiments of the present disclosure, the pairing information may indicate whether the near terminal device is paired with the far terminal device on the spatial layer to perform the multiuser superposition transmission. In some embodiments, the network device 140 may determine that the near terminal device 110 and the far terminal device 120 are on the first spatial layer according to positions of the terminals in a cell. Then, the network device 140 may determine whether the two terminal devices are paired so as to perform MUST. Taking the first spatial layer in FIG. 2 as an example, the network device 140 may determine the near terminal device 110 and the far terminal device 120 are paired on the first spatial layer.

At 420, power allocation information is determined based on the pairing information. The power allocation information may include a variety of information, for example, one or more of: pairing information between the near terminal device and the far terminal device, power allocation indication between a near terminal device and a far terminal device on the spatial layer, and so on. In some embodiments, the pairing information between the near terminal device and the far terminal device may be implemented as a 1 bit indicator for example, and that the bit is "1" and "0" indicates whether the near terminal device 110 is paired with the far terminal device 120, respectively. It should be understood that there are other implementations of the indication regarding whether the near terminal device 110 is paired with the far terminal device 120. The above example is merely illustrative rather than limiting. For example, the pairing information may further be implemented as an indicator with a plurality of bits, the plurality of bits indicating different pairing cases.

The indication of the power allocation between the near terminal device and the far terminal device may be implemented as a power allocation ratio (e.g., 1:2) between the near terminal device and the far terminal device, a power difference (e.g., 1 db) therebetween, power values of them (e.g., 0.3 and 0.7), or other appropriate type of indication.

At 430, the power allocation information is transmitted in downlink control information of a subframe. In some embodiments, the subframe for transmitting the power allocation information may be a specific subframe, e.g., one or more predefined continuous or discontinuous subframes. In other embodiments, the network device 140 may send the power allocation information to the near terminal device 110 in downlink control information of each subframe.

Figure 5:
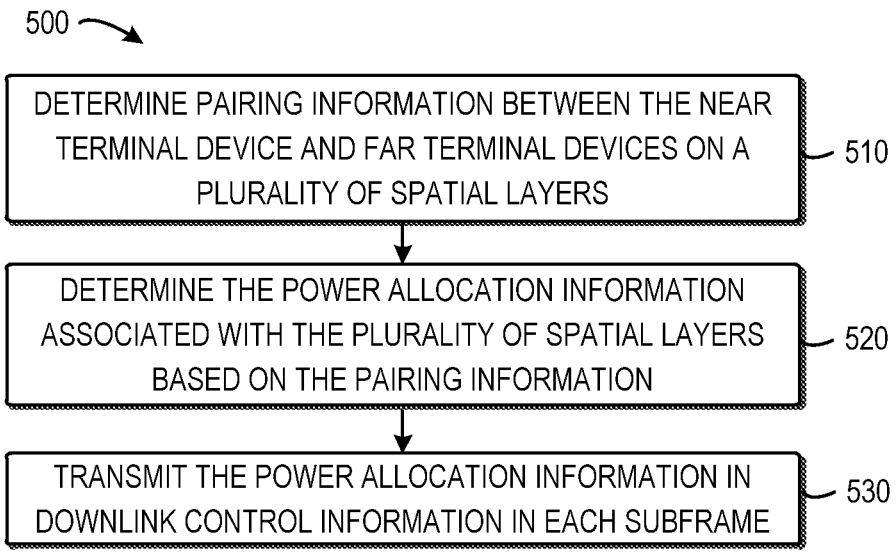
FIG. 5 shows a flowchart of a method for indicating power allocation implemented at network device side according to some embodiments of the present disclosure.

FIG. 5 shows a flowchart of a method 500 for indicating power allocation implemented at network device side according to some embodiments of the present disclosure. The method 500 may be regarded as another implementation of the method 300 and may be implemented at the network device 140 as shown in FIG. 1 and FIG. 2. In the embodiment shown in FIG. 5, the network device 140 may have a plurality of spatial layers, for example 2 spatial layers shown in FIG. 2. The near terminal device 110 and the far terminal device 120 communicate with the network device 140 on the first spatial layer, and the near terminal device 110 and the far terminal device 130 communicate with the network device 140 on the second spatial layer. Accordingly, the near terminal device 110 may receive a superposed signal (referred to as "second signal") of its own signal and a signal of the far terminal device 120 on the first spatial layer and receive a superposed signal (referred to as "third signal") of its own signal and a signal of the far terminal device 130 on the second spatial layer. It should be understood the method 500 is merely exemplary rather than limiting, and the embodiments of the present disclosure should not be construed as being limited thereto.

At 510, pairing information between a near terminal device and far terminal devices on a plurality of spatial layers is determined. Taking FIG. 2 as an example, the network device 140 may determine that the near terminal device 110 is paired with the far terminal device 120 on the first spatial layer (referred to as "layer 1") and the near terminal device 110 is paired with the far terminal device 130 on the second spatial layer (referred to as "layer 2"). Accordingly, the network device 140 may determine at 510 such pairing information that indicates: whether the near terminal device 110 is paired with the far terminal device 120 on layer 1, and whether the near terminal device 110 is paired with the far terminal device 130 on layer 2.

At 520, power allocation information is determined based on the pairing information. The power allocation information is associated with the plurality of spatial layers and for example, may include: pairing information between the near terminal device and a far terminal device on each spatial layer of the plurality of spatial layers, power allocation indication among the plurality of spatial layers, power allocation indication between the near terminal device and a far terminal device on each of the plurality of spatial layers, and/or other appropriate information.

According to the embodiments of the present disclosure, in cases of dynamic pairing in MUST transmission, whether MUST transmission is paired for both layers or for only one spatial layer has an impact on the power allocation between the two spatial layers for a near terminal device. In some embodiments, an indicator may be set in downlink control information of the subframe to indicate pairing information between the near terminal device and a far terminal device on each spatial layer of a plurality of spatial layers. The indicator may be referred to as "layer MUST indication (LMI)". In the case of two spatial layers shown in FIG. 2, the LMI may be implemented using 2 bits, for example. Table 1 below shows an exemplary correspondence with 2 bits indicating whether layer 1 and layer 2 are paired for MUST.

TABLE 1

| Layer MUST Indication (LMI) | Layer 1 with MUST Interference | Layer 2 with MUST Interference |
|---|---|---|
| 00 | No | No |
| 10 | Yes | No |
| 01 | No | Yes |
| 11 | Yes | Yes |

In Table 1, "00" denotes both layer 1 and layer 2 are not paired for MUST and are in non-MUST transmission;

"10" denotes that layer 1 is paired for MUST, while layer 2 is not paired for MUST and is in non-MUST transmission;

"01" denotes that layer 1 is not paired for MUST and in non-MUST transmission, while layer 2 is paired for MUST; and "11" denotes both layer 1 and layer 2 are paired for MUST and are in MUST transmission.

According to the embodiments of the present disclosure, power allocation indication between a plurality of spatial layers (also referred to as "inter-layer power allocation indication" (ILPAI)) may be implemented as the power ratio between various layers, the power offset (or "power difference") between various layers, or in another appropriate form, where total transmit power (also referred to as "total power") corresponds to nominal power configured by higher layers.

The inter-layer power allocation may be implemented in various manners. In some embodiments, if all spatial layers are in MUST transmission or in non-MUST transmission, the power may be equally allocated among the plurality of spatial layers. Taking FIG. 2 as an example, if both the first and second spatial layers are in non-MUST transmission, the power may be equally allocated between the first and second spatial layers. In addition, if both the first and second spatial layers are in MUST transmission, i.e., when the near terminal device 110 is paired with the far terminal device 120 on the first spatial layer and the near terminal device 110 is paired with the far terminal device 120 on the second spatial layer, the power may be equally allocated between the first and second spatial layers. In other words, where the LMI is "00" or "11", the total transmit power is equally divided between the layer 1 and the layer 2, thus ILPAI may be unnecessary. As an alternative, in the above case, an equal allocation of power may be indicated by the ILPAI.

In some embodiments, if multiuser superposition transmission is performed on one spatial layer of a plurality of spatial layers, in order to reduce interference, a larger power is allocated to the spatial layer on which MUST is performed than a spatial layer on which MUST is not performed. Taking FIG. 2 as an example, in that case that layer 1 is paired for MUST while layer 2 is not paired for MUST, i.e., the near terminal device 110 is paired with the far terminal device 120 on layer 1 but is not paired with the far terminal device 130 on layer 2, the power allocated to layer 1 may be larger than layer 2, so as to mitigate interference. At this point, the ILPAI may indicate a power offset or a power ratio between layer 1 and layer 2. On the contrary, if layer 1 is not in MUST but layer 2 is in MUST, the power allocated to layer 2 may be larger than that allocated to layer 1, so as to mitigate interference. At this point, the ILPAI may indicate a power offset or a power ratio between layer 2 and layer 1.

In one embodiment according to the present disclosure, the ILPAI may include a power ratio of power allocation between layer 1 and layer 2, as shown in Table 2.

TABLE 2

| ILPAI (2 bits) | Power Ratio |
|---|---|
| 00 | 1:1 |
| 01 | 2:1 |
| 10 | 3:2 |
| 11 | 3:1 |

Table 2 shows an example of the ILPAI in the form of the power ratio, wherein "00" indicates that the power ratio between layer 1 and layer 2 is 1:1, and "01", "10" and "11" indicate the power ratios between layer 1 and layer 2 is 2:1, 3:2 and 3:1, respectively. These power ratios may be calculated based on the power allocated by the network device 140 to each spatial layer and the total transmit power. Accordingly, the terminal device 110, upon receipt of the power allocation information, may determine the power allocated to a current layer according to the ILPAI.

In another embodiment according to the present disclosure, the ILPAI may include a power offset of power allocation between layer 1 to layer 2, as shown in Table 3.

TABLE 3

| ILPAI (2 bits) | Power Offset |
|---|---|
| 00 | 0 dB |
| 01 | 1 dB |
| 10 | 2 dB |
| 11 | 3 dB |

Table 3 shows an example of the ILPAI in the form of the power offset. It should be understood the values of power ratio or power offset listed in Table 2 and Table 3 are just exemplary rather than limiting. In the embodiments of the present disclosure, these values may be determined in various manners, for example, they be empirical values or set by the standardization FFS. In some embodiments, they may be further set based on the ratio between the near and far UEs.

In some embodiments, if the LMI is "10", when layer 1 is paired for MUST while layer 2 is not paired for MUST, the power allocated to layer 1 is larger than that allocated to layer 2 in order to avoid severe interference to the paired far UE. Therefore, the ILPAI may indicate a power offset between layer 1 and layer 2. In one embodiment, if the ILPAI is "10", it may indicate that the power allocation ratio between layer 1 and layer 2 is "3:2" as shown in Table 2. In another embodiment, as shown in Table 3, if the ILPAI is "11", it may indicate that the power offset between layer 1 and layer 2 is "3 dB", i.e., the power of layer 1 is 3 dB larger than that of layer 2.

In further embodiments, if the LMI is "01", when layer 1 is not paired for MUST while layer 2 is paired for MUST, the power allocated to layer 2 is larger than that allocated to layer 1 in order to avoid severe interference to the paired far UE. Therefore, the ILPAI may indicate a power offset between layer 1 and layer 2. In one embodiment, as shown in Table 2, if the ILPAI is "10", it may indicate that the power allocation ratio between layer 2 and layer 1 is "3:2". In another embodiment, as shown in Table 3, if the ILPAI is "11", it may indicate that the power offset between layer 2 and layer 1 is "3 dB", i.e., the power of layer 2 is 3 dB larger than that of layer 1.

According to the embodiments of the present disclosure, the LMI and ILPAI may be coded jointly as shown in Table 4.

TABLE 4

| LMI + ILPAI | LMI | ILPAI | Power ratio between layer 1 and layer 2 |
|---|---|---|---|
| 000 | 00 | 00 | 1:1 |
| 001 | 11 | 00 | 1:1 |
| 010 | 10 | 01 | 2:1 |
| 011 | 10 | 10 | 3:2 |
| 100 | 10 | 11 | 3:1 |
| 101 | 01 | 01 | 1:2 |
| 110 | 01 | 10 | 2:3 |
| 111 | 01 | 11 | 1:3 |

Table 4 shows an example of joint coding of the LMI and ILPAI. Take the $3^{rd}$ row in Table 3 as an example to explain the meaning of Table 3. In the $3^{rd}$ row, that LMI+ILPAI is "010" indicates the LMI is "10" and the ILPAI is "01", at which point the power allocation ratio (i.e., power ratio) between layer 1 and layer 2 is 2:1.

When one of layer 1 and layer 2 is in single user transmission (e.g., single user multiple-input multiple-output, SU-MIMO) (corresponding to the $1^{st}$ row in Table 4) or the both spatial layers are in MUST (corresponding to the $2^{nd}$ row in Table 4), the power is equally allocated between layer 1 and layer 2. While one of layer 1 and layer 2 is in MUST (corresponding to the $3^{rd}$-$8^{th}$ rows in Table 4), the network device 140 may configure the power ratios or power offsets according to Table 4.

According to the embodiments of the present disclosure, the power allocation information may further include power allocation indication (IUPAI) between a near terminal device and a far terminal device on each spatial layer. The indication of the power allocation may be, for example, a normalized power ratio generated according to a predefined rule. For example, the power ratio may be in a range [0.7, 0.95]. In some embodiments, a 2-bit IUPAI may be used to indicate the power allocation between the far UE and the near UE on the MUST spatial layer. Table 5 shows an example of the IUPAI.

TABLE 5

| IUPAI (2 bits) | Power ratio |
|---|---|
| 00 | PR0 |
| 01 | PR1 |
| 10 | PR2 |
| 11 | PR3 |

In Table 5, if the IUPAI is "00", "01", "10" or "11", it can be determined that the corresponding power ratio is PR0, PR1, PR2 or PR3 respectively. PR0, PR1, PR2 and PR3 may be four values in the range [0.7, 0.95], which may be calculated in various manners. In one embodiment, if the LMI is "10", that is, layer 1 is paired for MUST while layer 2 is not paired for MUST, then a power ratio between layer 1 and layer 2 may be calculated according to respective powers allocated to the near UE and the far UE on spatial layer 1. Afterwards, the power ratio is normalized to derive PRi, wherein i=0, 1, 2, 3.

At 530, the power allocation information is sent in downlink control information of each subframe. According to the embodiments of the present disclosure, the power allocation information determined at 520 may be transmitted in DCI or enhanced DCI of each subframe. However, this is merely exemplary rather than limiting. For example, in some other embodiments of the present disclosure, the power allocation information may be transmitted in one or more continuous or discontinuous subframes.

Figure 9:
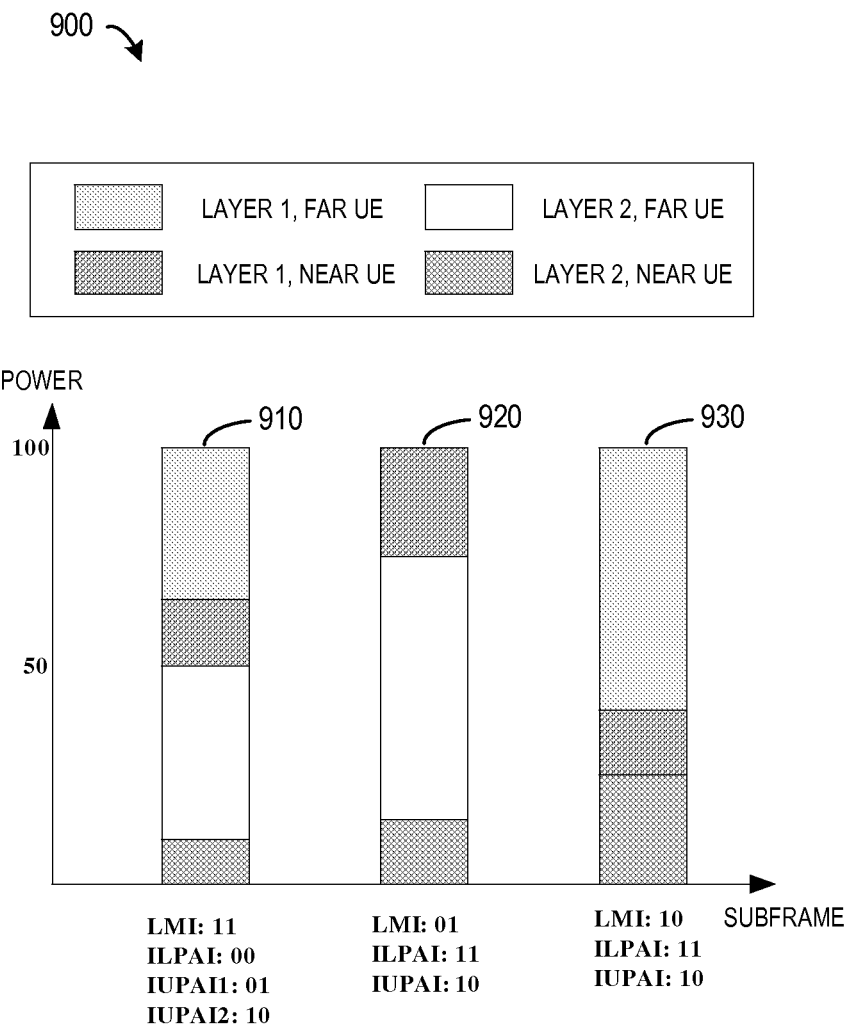
FIG. 9 shows a schematic view of power allocation of rank 2 MUST according to some embodiments of the present disclosure.

FIG. 9 shows a schematic view of power allocation for rank 2 MUST according to some embodiments of the present disclosure. In the embodiments shown with respect to FIG. 9, if the LMI is "11", the ILPAI is "00", the IUPAI1 (i.e., the IUPAI of layer 1) is "01", and the IUPAI2 (i.e., the IUPAI of layer 2) is "10", then the power allocation information is as shown in 910. If the LMI is "01", the ILPAI is "11", and the IUPAI1 is "11", then the power allocation information is as shown in 920. If the LMI is "10", the ILPAI is "11", and the IUPAI1 is "10", the power allocation information is as shown in 930.

Figure 6:
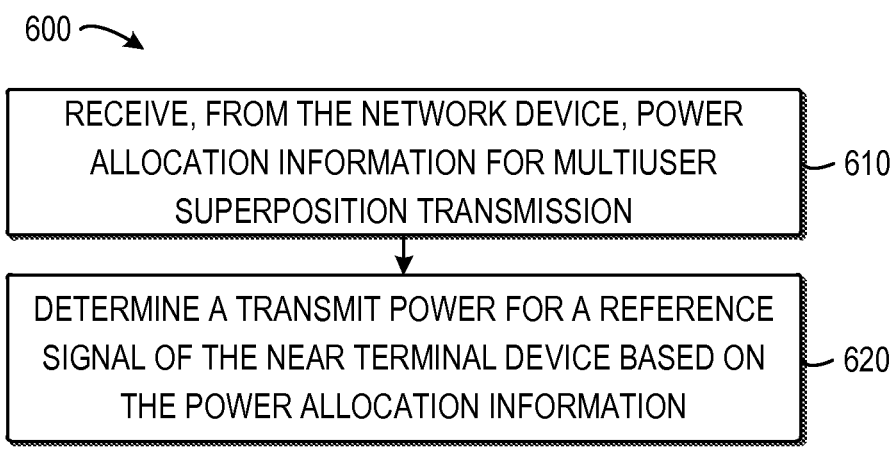
FIG. 6 shows a flowchart of a method for indicating power allocation implemented at terminal device side according to some embodiments of the present disclosure.

FIG. 6 shows a flowchart of a method 600 for indicating power allocation according to some embodiments of the present disclosure. It may be understood the method 600 may be implemented at, for example, the near terminal device 110 as shown in FIG. 1 and FIG. 2. For the discussion purpose, description is presented below to the method 600 with reference to FIG. 1 and FIG. 2.

At 610, power allocation information for multiuser superposition transmission is received from a network device. According to the embodiments of the present disclosure, the power allocation information indicates power allocation for the multiuser superposition transmission between a near terminal device and a far terminal device on one or more spatial layers. The terminal device 110 may receive the power allocation information from downlink control information of a subframe.

In some embodiments, the power allocation information may be received on one or more predefined subframes. The predefined subframes may be either a single subframe, or several continuous or discontinuous subframes. In case of discontinuous subframes, these subframes may have regular or irregular intervals. The network device 140 may send the power allocation information to the near terminal device 110 on these predefined subframes. Accordingly, the near terminal device 110 may obtain the power allocation information from the network device 140 in downlink control information of these predefined subframes.

As an alternative, the network device 140 may send the power allocation information to the near terminal device 110 in downlink control information of each subframe. Accordingly, the near terminal device 110 may obtain the power allocation information from downlink control information of each subframe transmitted from the network device 140.

At 620, transmit power for a reference signal of the near terminal device is determined based on the power allocation information. In some embodiments, the network device 140 has only one spatial layer, e.g., the first spatial layer in FIG. 2. The near terminal device 110 and the far terminal device 120 communicate with the network device 140 on this spatial layer. The power allocation information may comprise: pairing information between the near terminal device and a far terminal device on one spatial layer, an indication of power allocation between the near terminal device and the far terminal device on the spatial layer, and/or other appropriate information. In these embodiments, at 620, the terminal device 110 may determine, based on the pairing information, whether the near terminal device and the far terminal device perform the multiuser superposition transmission. If it is determined the near terminal device and the far terminal device perform the multiuser superposition transmission, then the terminal device 110 may determine transmit power for a reference signal of the near terminal device based on the power allocation information.

As an alternative, in some embodiments, the network device 140 may have a plurality of spatial layers, e.g., 2 spatial layers shown in FIG. 2. The near terminal device 110 and the far terminal device 120 communicate with the network device 140 on the first spatial layer, and the near terminal device 110 and the far terminal device 130 communicate with the network device 140 on the second spatial layer. In this case, the power allocation information may comprise: pairing information between the near terminal device and a far terminal device on each of the plurality of spatial layers, an indication of power allocation among the plurality of spatial layers, an indication of power allocation between the near terminal device and a far terminal device on each of the plurality of spatial layers, and/or other relevant information. In the foregoing embodiments, the near terminal device 110 may determine, from the plurality of spatial layers, a group of spatial layers for performing the multiuser superposition transmission based on the pairing information. Then, the near terminal device 110 may determine a layer power allocated to each spatial layer in the group of spatial layers, based on the indication of the power allocation among the plurality of spatial layers. Afterwards, the near terminal device 110 may determine the transmit power for the reference signal of the near terminal device on each spatial layer in the group of spatial layers, based on the indication of the power allocation between the near terminal device and a far terminal device on each of the plurality of spatial layers and the determined layer power.

On the basis of the determined transmit power, the probability of successful detection of reference signals can be increased at the near terminal device 110, and thus the system performance can be improved.

Figure 7:
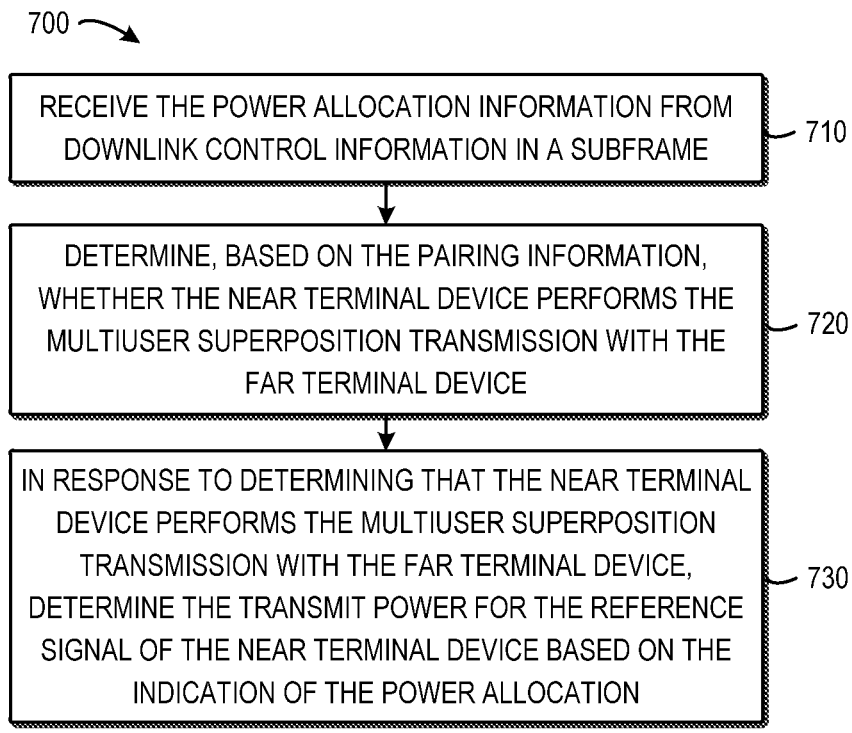
FIG. 7 shows a flowchart of a method for indicating power allocation implemented at terminal device side according to some embodiments of the present disclosure.

FIG. 7 shows a flowchart of a method 700 for indicating power allocation implemented at terminal device side according to some embodiments of the present disclosure. The method 700 may be regarded as one implementation of the method 600 and may be implemented at the near terminal device 110 as shown in FIG. 1 and FIG. 2. In the embodiment shown in FIG. 7, there is only one spatial layer (e.g., the first spatial layer in FIG. 2), on which the near terminal device 110 and the far terminal device 120 communicate with the network device 140. It should be understood the method 700 is merely exemplary rather than limiting, and the embodiments of the present disclosure should not be construed as being limited thereto.

At 710, power allocation information is received from downlink control information in a subframe. In some embodiments, the power allocation information may be transmitted by the network device 140 in one or more predefined subframes that are either continuous or discontinuous. Accordingly, the near terminal device 110 may obtain the power allocation information from the subframe(s) or from DCI in the subframe(s).

As an alternative, in some other embodiments, the network device 140 transmits the power allocation information in DCI in each subframe. Accordingly, the near terminal device 110 may obtain the power allocation information from DCI in each subframe.

In the embodiment shown in FIG. 7, the power allocation information received at 710 may comprise various information, such as pairing information between the near terminal device and the far terminal device, an indication of power allocation between the near terminal device and the far terminal device on the spatial layer, and/or other relevant information.

At 720, it is determined based on pairing information whether the near terminal device and the far terminal device perform the multiuser superposition transmission. The pairing information is, for example, the pairing information between the near terminal device and the far terminal device received at 710, and may be implemented as a 1-bit indicator. If the terminal device 110 determines that the bit is "1", it may be determined the near terminal device 110 is paired with the far terminal device 120. If the terminal device 110 determines the bit is "0", it can be determined that the near terminal device 110 is not paired with the far terminal device 120.

At 730, in response to determining that the near terminal device performs the multiuser superposition transmission with the far terminal device, the transmit power for the reference signal of the near terminal device is determined based on power allocation indication. The power allocation indication is, for example, an indication of power allocation between the near terminal device and the far terminal device on the spatial layer received at 710, and may be implemented in various forms such as a power allocation ratio (e.g., 1:2) between the near terminal device 110 and the far terminal device 120, a power difference (e.g., 1 db) between them, power values of them (e.g., 0.3 and 0.7), and so on.

For example, the near terminal device 110 may determine, based on the power allocation ratio, how much power in the total power is associated with the near terminal device 110, and/or how much power is associated with the far terminal device 120. As such, the near terminal device 110 can calculate how much power is allocated to itself, facilitating the increase of the possibility of successful signal detection.

Figure 8:
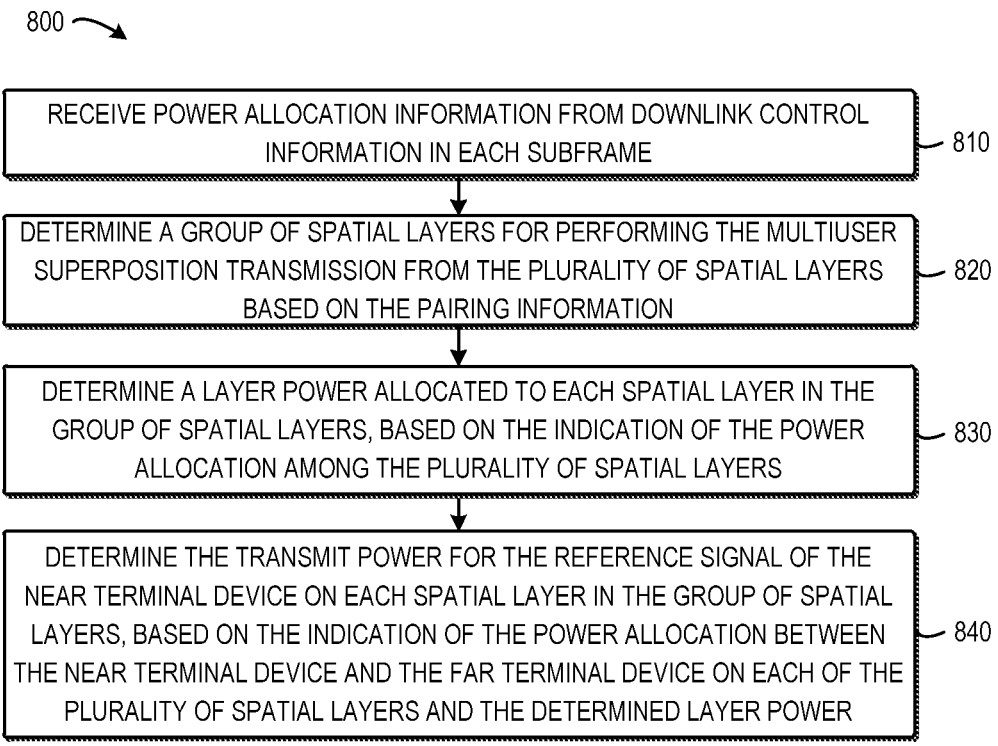
FIG. 8 shows a flowchart of a method for indicating power allocation implemented at terminal device side according to some embodiments of the present disclosure.

FIG. 8 shows a flowchart of a method 800 for indicating power allocation implemented at terminal device side according to some embodiments of the present disclosure. The method 800 may be regarded as another implementation of the method 600 and may be implemented at the near terminal device 110 as shown in FIG. 1 and FIG. 2. The embodiment shown in FIG. 8 comprises plurality of spatial layers, for example 2 spatial layers shown in FIG. 2. The near terminal device 110 and the far terminal device 120 communicate with the network device 140 on the first spatial layer, and the near terminal device 110 and the far terminal device 130 communicate with the network device 140 on the second spatial layer. It should be understood the method 800 is merely exemplary rather than limiting, and the embodiments of the present disclosure should not be construed as being limited thereto.

At 810, power allocation information is received from downlink control information of each subframe. According to the embodiments of the present disclosure, the network device 140 may transmit power allocation information in DCI or enhanced DCI in each subframe. Accordingly, the terminal device 110 may receive at 810 the power allocation information transmitted in DCI or enhanced DCI in each subframe. However, this is merely exemplary rather than limiting. For example, in some other embodiments of the present disclosure, the network device 140 may transmit the power allocation information in one or more continuous or discontinuous subframes, thus the terminal device 110 may receive the power allocation information in the one or more continuous or discontinuous subframes.

According to the embodiments of the present disclosure, the power allocation information received at 810 may include: pairing information between the near terminal device and a far terminal device on each spatial layer of a plurality of spatial layers, an indication of power allocation among the plurality of spatial layers, an indication of power allocation between the near terminal device and a far terminal device on each of the plurality of spatial layers, and/or other appropriate information. The pairing information may be indicated using the examples of LMI shown in Table 1. The indication of the power allocation among the plurality of spatial layers may be indicated using the examples of ILPAI shown in Table 2 and Table 3. Further, the pairing information and the indication of the power allocation between the plurality of spatial layers may be jointly indicated, for example, by using the examples of the joint indication in Table 4. In addition, power allocation indication between far terminal devices on each spatial layer may be implemented using the examples of IUPAI in Table 5. It should be understood the embodiment shown in Table 1 to Table 5 is merely exemplary rather than limiting, and the embodiments of the present disclosure should not be construed as being limited thereto. In fact, those skilled in the art may implement the indication of the power allocation information in other suitable ways.

At 820, a group of spatial layers for the multiuser superposition transmission is determined from the plurality of spatial layers based on the pairing information. It should be understood the "group of spatial layers" may include one or more spatial layers for MUST. In some embodiments, if there are a total of 2 spatial layers, when the LMI is "01", the terminal device 110 may determine that MUST is performed on layer 2; and when the LMI is "10", the terminal device 110 may determine that MUST is performed on layer 1.

At 830, a layer power allocated to each spatial layer in the group of spatial layers is determined based on the indication of the power allocation among the plurality of spatial layers. In some embodiments, the indication of power allocation among the plurality of spatial layers is implemented using the ILPAI example shown in Table 2 or Table 3. In this case, the terminal device 110 may determine a power allocation ratio or power allocation offset corresponding to the indication of the power allocation, ILPAI, by querying Table 2 or Table 3. Thus, the layer power allocated to each spatial layer may be calculated based on total power.

At 840, a transmit power for the reference signal of the near terminal device on each spatial layer in the group of spatial layers is determined based on the indication of the power allocation between the near terminal device and a far terminal device on each of the plurality of spatial layers and the determined layer power. In some embodiments, the indication of the power allocation between the near terminal device and the far terminal device on each of the plurality of spatial layers may be indicated using the examples of IUPAI shown in Table 5. In this case, the terminal device 110 may determine power allocation between the near UE and the far UE on each spatial layer by querying Table 5, thereby calculating the layer power allocated to the near UE and the far UE based on the determined layer power of each spatial layer in 830.

Figure 10:
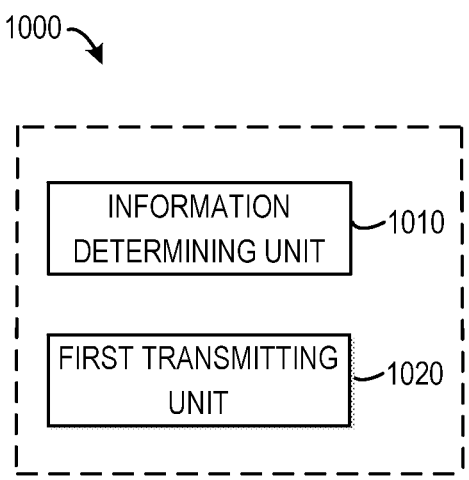
FIG. 10 shows a block diagram of an apparatus according to some embodiments of the present disclosure.

FIG. 10 shows a block diagram of an apparatus 1000 according to some embodiments of the present disclosure. It may be understood the apparatus 1000 may be implemented in the network device 140 shown in FIG. 1 and FIG. 2 or other appropriate device. As shown in FIG. 10, the apparatus 1000 comprises: an information determining unit 1010 configured to determine power allocation information for multiuser superposition transmission, the power allocation information indicating power allocation for the multiuser superposition transmission between a near terminal device and far terminal devices on one or more spatial layers; and a first transmitting unit 1020 configured to dynamically transmit the power allocation information to the near terminal device.

In some embodiments, the information determining unit 1010 may comprise: a first determining unit configured to determine pairing information between the near terminal device and a far terminal device on one spatial layer, the pairing information indicating whether the near terminal device and the far terminal device are paired on the spatial layer to perform the multiuser superposition transmission; and a second determining unit configured to determine the power allocation information based on the pairing information, the power allocation information including one or more of: the pairing information between the near terminal device and the far terminal device, and an indication of power allocation between the near terminal device and the far terminal device on the spatial layer.

In some embodiments, the information determining unit 1010 may comprise: a third determining unit configured to determine pairing information between the near terminal device and far terminal devices on a plurality of spatial layers, the pairing information indicating whether the near terminal device is paired with a far terminal device on each of the plurality of spatial layers to perform the multiuser superposition transmission; and a fourth determining unit configured to determine the power allocation information based on the pairing information, the power allocation information including one or more of: the pairing information between the near terminal device and a far terminal device on each of the plurality of spatial layers, an indication of power allocation among the plurality of spatial layers, and an indication of power allocation between the near terminal device and the far terminal device on each of the plurality of spatial layers.

In some embodiments, the information determining unit 1010 may comprise: a first allocating unit configured to, if the multiuser superposition transmission is performed on all or none of the plurality of spatial layers, allocate powers among the plurality of spatial layers equally; and a second allocating unit configured to, if the multiuser superposition transmission is performed on one of the plurality of spatial layers, allocate, to a spatial layer on which the multiuser superposition transmission is performed, a power larger than a power allocated to a spatial layer of the plurality of spatial layers on which the multiuser superposition transmission is not performed.

In some embodiments, the first sending unit 1020 may comprise: a second transmitting unit configured to transmit the power allocation information in downlink control information in a subframe.

Figure 11:
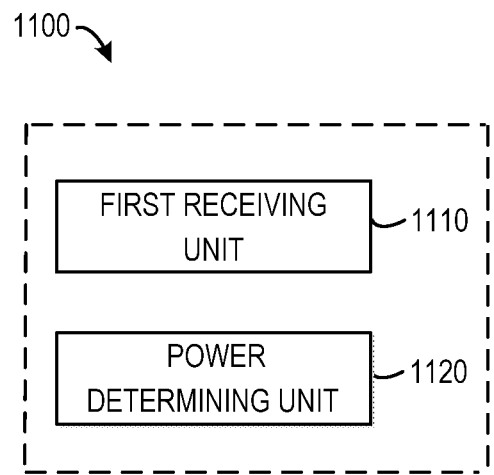
FIG. 11 shows a block diagram of an apparatus according to some embodiments of the present disclosure.

FIG. 11 shows a block diagram of an apparatus 1100 according to some embodiments of the present disclosure. It may be understood the apparatus 1100 may be implemented in the near terminal device 110 shown in FIGS. 1 and 2 or other appropriate device. As shown in FIG. 11, the apparatus 1100 comprises: a first receiving unit 1100 configured to receive from a network device power allocation information for multiuser superposition transmission, the power allocation information indicating power allocation for the multiuser superposition transmission between the near terminal device and far terminal devices on one or more spatial layers; and a power determining unit 1120 configured to determine a transmit power for a reference signal of the near terminal device based on the power allocation information.

In some embodiments, the first receiving unit 1100 may comprise: a second receiving unit configured to receive the power allocation information from downlink control information in a subframe.

In some embodiments, the power allocation information may comprise one or more of: pairing information between the near terminal device and a far terminal device on one spatial layer, and an indication of power allocation between the near terminal device and the far terminal device on the spatial layer.

In the foregoing embodiments, the power determining unit 1120 may comprise: a first determining unit configured to determine, based on the pairing information, whether the near terminal device performs the multiuser superposition transmission with the far terminal device; and a second determining unit configured to, in response to determining that the near terminal device performs the multiuser superposition transmission with the far terminal device, determine the transmit power for the reference signal of the near terminal device based on the indication of the power allocation.

In some embodiments, the power allocation information may include one of more of: pairing information between the near terminal device and a far terminal device on each of a plurality of spatial layers, an indication of power allocation among the plurality of spatial layers, and an indication of power allocation between the near terminal device and the far terminal device on each of the plurality of spatial layers.

In the foregoing embodiments, the power determining unit 1120 may further comprise: a third determining unit configured to determine a group of spatial layers for performing the multiuser superposition transmission from the plurality of spatial layers based on the pairing information; a fourth determining unit configured to determine a layer power allocated to each spatial layer in the group of spatial layers, based on the indication of the power allocation among the plurality of spatial layers; and a fifth determining unit configured to determine the transmit power for the reference signal of the near terminal device on each spatial layer in the group of spatial layers, based on the indication of the power allocation between the near terminal device and the far terminal device on each of the plurality of spatial layers and the determined layer power.

It is to be understood each unit of the apparatus 1000 and the apparatus 1100 corresponds to each step of the methods 300 and 800 described with reference to FIGS. 3 to 8. Therefore, operations and features described above with reference to FIGS. 3 to 8 are also applicable to the apparatus 1000, the apparatus 1100 as well as units included in them, and meanwhile have the same effect, details of which are ignored here.

The units included in the apparatus 1000 and the apparatus 1100 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatus 1000 and the apparatus 1100 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The units shown in FIGS. 10 and 11 may be implemented, partially or entirely, as hardware modules, software modules, firmware modules or any combination thereof. In particular, in some embodiments, the flows, methods or processes described above may be implemented by hardware in a base station or terminal device. For example, the base station or terminal device may implement the methods 300 to 800 by means of its transmitter, receiver, transceiver and/or processor.

Figure 12:
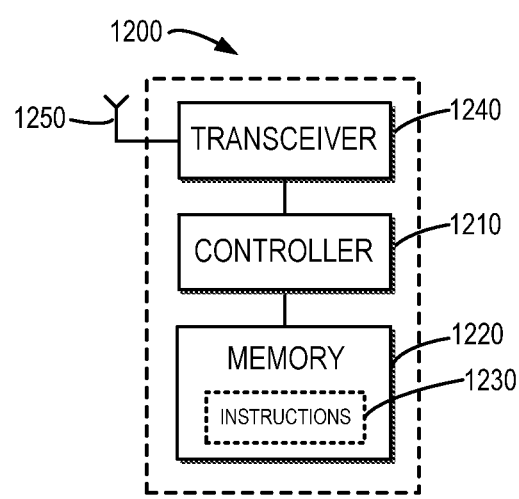
FIG. 12 shows a block diagram of a device according to some embodiments of the present disclosure.

FIG. 12 shows a block diagram of a device 1200 which is applicable to implement the embodiments of the present disclosure. The device 200 may be used for implementing a network device such as the network device 140 shown in FIGS. 1 and 2, or used for implementing a terminal device such as the near terminal device 110 shown in FIGS. 1 and 2.

As depicted, the device 1200 comprises a controller 1210. The controller 1210 controls operations and functions of the device 1200. For example, in some embodiments, the controller 1210 may execute various operations by means of instructions 1230 stored in a memory 1220 coupled to the controller 1210. The memory 1220 may be of any appropriate type that is applicable to a local technical environment, and may be implemented using any appropriate data storage techniques, including without limitation to, semiconductor based memory devices, magnetic memory devices and systems, optical memory devices and systems. Though only one memory unit is shown in FIG. 12, there may be a plurality of physically different memory units in the device 1200.

The controller 1210 may be of any appropriate type that is applicable to a local technical environment, and may include without limitation to, a general-purpose computer, a special-purpose computer, a microprocessor, a digital signal processor (DSP), as well as one or more processors in a processor based multi-core processor architecture. The device 1200 may also comprise multiple controllers 1210. The controller 1210 is coupled to a transceiver 1240 that may effect information receiving and transmitting by means of one or more antennas 1250 and/or other component.

When the device 1200 acts as the network device 140, the controller 1210 and the transceiver 1240 may operate in cooperation to implement the method 300 described with reference to FIG. 3. The controller 1210 is configured to determine power allocation information for multiuser superposition transmission, the power allocation information indicating power allocation for the multiuser superposition transmission between a near terminal device and far terminal devices on one or more spatial layers; and the transceiver 1240 is configured to dynamically transmit the power allocation information to the near terminal device dynamically.

In some embodiments, the controller 1210 may be further configured to: determine pairing information between the near terminal device and a far terminal device on one spatial layer, the pairing information indicating whether the near terminal device and the far terminal device are paired on the spatial layer to perform the multiuser superposition transmission; and determine the power allocation information based on the pairing information, the power allocation information including one or more of: the pairing information between the near terminal device and the far terminal device, and an indication of power allocation indication between the near terminal device and the far terminal device on the spatial layer.

In some embodiments, the controller 1210 may be further configured to: determine pairing information between the near terminal device and far terminal devices on a plurality of spatial layers, the pairing information indicating whether the near terminal device is paired with a far terminal device on each of the plurality of spatial layers to perform the multiuser superposition transmission; and determine the power allocation information based on the pairing information, the power allocation information including one or more of: the pairing information between the near terminal device and a far terminal device on each of the plurality of spatial layers, an indication of power allocation among the plurality of spatial layers, and an indication of power allocation between the near terminal device and the far terminal device on each of the plurality of spatial layers.

In some embodiments, the controller 1210 may be further configured to: if the multiuser superposition transmission is performed on all or none of the plurality of spatial layers, allocate powers among the plurality of spatial layers equally; and if the multiuser superposition transmission is performed on one of the plurality of spatial layers, allocate, to a spatial layer on which the multiuser superposition transmission is performed, a power larger than a power allocated to a spatial layer of the plurality of spatial layers on which the multiuser superposition transmission is not performed.

In some embodiments, the transceiver 1240 may be further configured to: transmit the power allocation information in downlink control information in a subframe.

When the device 1200 acts as the near terminal device 110, the controller 1210 and the transceiver 1240 may operate in cooperation to implement the method 600 described with reference to FIG. 6. The transceiver 1240 is configured to receive from a network device power allocation information for multiuser superposition transmission, the power allocation information indicating power allocation for the multiuser superposition transmission between a near terminal device and far terminal devices on one or more spatial layers; and the controller 1210 is configured to determine a transmit power for a reference signal of the near terminal device based on the power allocation information.

In some embodiments, the transceiver 1210 may be further configured to: receive the power allocation information from downlink control information in a subframe.

In some embodiments, the power allocation information may include one or more of: pairing information between the near terminal device and a far terminal device on one spatial layer, and an indication of power allocation between the near terminal device and the far terminal device on the spatial layer. In these embodiments, the controller 1210 may be further configured to: determine, based on the pairing information, whether the near terminal device performs the multiuser superposition transmission with the far terminal device; and in response to determining that the near terminal device performs the multiuser superposition transmission with the far terminal device, determine the transmit power for the reference signal of the near terminal device based on the indication of the power allocation.

In some embodiments, the power allocation information may include one of more of: pairing information between the near terminal device and a far terminal device on each of a plurality of spatial layers, an indication of power allocation among the plurality of spatial layers, and an indication of power allocation between the near terminal device and the far terminal device on each of the plurality of spatial layers. In these embodiments, the controller 1210 may be further configured to: determine a group of spatial layers for performing the multiuser superposition transmission from the plurality of spatial layers based on the pairing information; determine a layer power allocated to each spatial layer in the group of spatial layers, based on the indication of the power allocation among the plurality of spatial layers; and determine the transmit power for the reference signal of the near terminal device on each spatial layer in the group of spatial layers, based on the indication of the power allocation between the near terminal device and the far terminal device on each of the plurality of spatial layers and the determined layer power.

Figure 3:
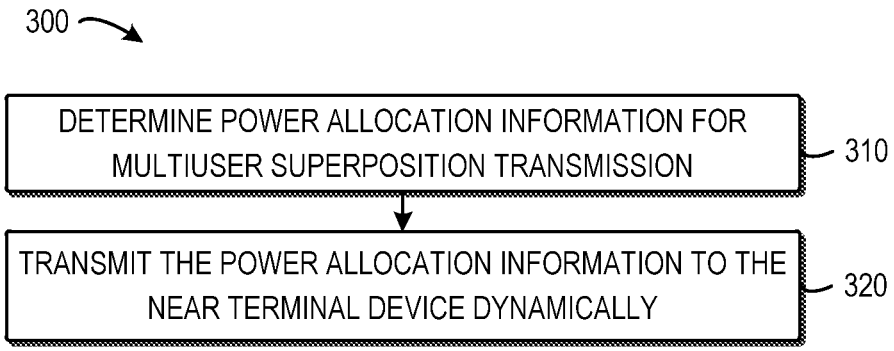
FIG. 3 shows a flowchart of a method for indicating power allocation implemented at the network device side according to some embodiments of the present disclosure.

All features described with reference to FIGS. 3 and 6 are applicable to the device 1200, which is ignored here.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

We claim:

1. A communication method implemented at a terminal device, the terminal device being a near terminal device of a network device, the method comprising:
   receiving, from the network device, power allocation information for multiuser superposition transmission, the power allocation information indicating power allocation for the multiuser superposition transmission between the near terminal device and far terminal devices on one or more spatial layers; and
   determining a transmit power for a reference signal of the near terminal device based on the power allocation information by:
   determining, based on pairing information between the near terminal device and a far terminal device on at least one spatial layer, whether the near terminal device performs the multiuser superposition transmission with the far terminal device; and
   in response to determining that the near terminal device performs the multiuser superposition transmission with the far terminal device, determining the transmit power for the reference signal of the near terminal device based on the indication of the power allocation.

2. The method according to claim 1, wherein the receiving from the network device power allocation information for multiuser superposition transmission comprises:
   receiving the power allocation information from downlink control information in a subframe.

3. The method according to claim 1, wherein the power allocation information includes one or more of:
   pairing information between the near terminal device and a far terminal device on one spatial layer, and
   an indication of power allocation between the near terminal device and the far terminal device on the spatial layer.

4. The method according to claim 1, wherein the power allocation information includes one of more of:
   pairing information between the near terminal device and a far terminal device on each of a plurality of spatial layers,
   an indication of power allocation among the plurality of spatial layers, and
   an indication of power allocation between the near terminal device and the far terminal device on each of the plurality of spatial layers.

5. The method according to claim 4, wherein the determining a transmit power for a reference signal of the near terminal device based on the power allocation information comprises:
   determining a group of spatial layers for performing the multiuser superposition transmission from the plurality of spatial layers based on the pairing information;
   determining a layer power allocated to each spatial layer in the group of spatial layers, based on the indication of the power allocation among the plurality of spatial layers; and
   determining the transmit power for the reference signal of the near terminal device on each spatial layer in the group of spatial layers, based on the indication of the power allocation between the near terminal device and the far terminal device on each of the plurality of spatial layers and the determined layer power.

6. A terminal device, the terminal device being a near terminal device of a network device and comprising:
- a transceiver configured to receive, from the network device, power allocation information for multiuser superposition transmission, the power allocation information indicating power allocation for the multiuser superposition transmission between the near terminal device and far terminal devices on one or more spatial layers;
- a controller configured to determine a transmit power for a reference signal of the near terminal device based on the power allocation information by:
- determining, based on pairing information between the near terminal device and a far terminal device on at least one spatial layer, whether the near terminal device performs the multiuser superposition transmission with the far terminal device; and
- in response to determining that the near terminal device performs the multiuser superposition transmission with the far terminal device, determining the transmit power for the reference signal of the near terminal device based on the indication of the power allocation.

* * * * *